US007264092B2

(12) United States Patent
Jetté

(10) Patent No.: US 7,264,092 B2
(45) Date of Patent: Sep. 4, 2007

(54) WHEEL CHOCK RESTRAINT SYSTEM

(75) Inventor: Gaetan Jetté, Mascouche (CA)

(73) Assignee: GMK Safety Inc., Terrebonne (CA)

( * ) Notice: Subject to any disclaimer, the term of this patent is extended or adjusted under 35 U.S.C. 154(b) by 0 days.

(21) Appl. No.: 11/295,185

(22) Filed: Dec. 7, 2005

(65) Prior Publication Data

US 2006/0144649 A1    Jul. 6, 2006

Related U.S. Application Data

(62) Division of application No. 10/370,771, filed on Feb. 24, 2003, now Pat. No. 7,032,720.

(51) Int. Cl.
*B61H 13/00* (2006.01)
(52) U.S. Cl. ............................ 188/36; 188/32; 414/401
(58) Field of Classification Search .................... 188/5, 188/31, 32, 36, 4 R; 294/81.1, 81.2, 81.4, 294/904, 81.41; 410/9, 19, 30, 49, 52; 414/396, 414/401, 426, 429
See application file for complete search history.

(56) References Cited

U.S. PATENT DOCUMENTS

| | | | | |
|---|---|---|---|---|
| 4,217,831 A | * | 8/1980 | Koliba et al. ................ 410/121 |
| 4,833,442 A | * | 5/1989 | Von Heck .................... 340/427 |
| 4,963,068 A | | 10/1990 | Gelder | |
| 4,969,792 A | * | 11/1990 | Ellis et al. ................... 414/401 |
| 4,973,213 A | | 11/1990 | Erlandsson | |
| 5,025,877 A | | 6/1991 | Assh | |
| 5,312,213 A | | 5/1994 | Winsor | |
| 5,410,897 A | * | 5/1995 | Edmondson .................. 70/226 |
| 5,520,034 A | * | 5/1996 | Edmondson .................. 70/226 |
| 5,803,208 A | * | 9/1998 | Blach .......................... 188/32 |
| 6,123,496 A | * | 9/2000 | Alexander ................... 414/401 |
| 6,336,527 B1 | | 1/2002 | Metz | |
| 6,505,713 B1 | * | 1/2003 | Paul et al. .................... 188/36 |
| 6,938,734 B2 | * | 9/2005 | Curl ............................. 188/32 |
| 7,032,720 B2 | * | 4/2006 | Jette et al. .................... 188/36 |
| 2005/0226705 A1 | * | 10/2005 | Wilson ........................ 414/401 |

FOREIGN PATENT DOCUMENTS

CA          2164738          6/1997

* cited by examiner

*Primary Examiner*—Pam Rodriguez
(74) *Attorney, Agent, or Firm*—Mila Shvartsman

(57) ABSTRACT

Wheel chock restraint system comprising a wheel chock, a supporting element mounted on the ground near a loading dock and a support assembly connected by one end to the wheel chock and by another end near the loading dock. A base portion of the chock is provided with first engagement elements and the supporting elements are provided with corresponding second engagement elements, cooperating to create a retention force to prevent the chock from sliding away from the wheel of a vehicle attempting to depart prematurely. The first engagement elements comprise teeth extending downwardly under an angle and the second engagement elements are stoppers extending upwardly from the supporting element. This system also comprises an anti-theft locking device; which, together with the first and second engagement elements, securely locks the chock on the wheel of the vehicle to prevent any unauthorized removal of the chock and theft of the vehicle.

21 Claims, 8 Drawing Sheets

WHEEL CHOCK RESTRAINT SYSTEM

This is a divisional application of the previously filed application Ser. No.: 10/370,771 filed on Feb. 24, 2003, now U.S. Pat. No. 7,032,720.

The present invention relates to wheel chocks, and more particularly to a wheel chock restraint system provided to engage the wheel of a truck to prevent it from moving away from the loading dock during loading and unloading.

Loading and unloading operations are hazardous for fork lifts entering and exiting the truck trailer. It is imperative that a truck remain immovably docked to the loading dock to prevent moving fork lifts from falling through the space created if a truck trailer moves truck away from the loading dock during loading and unloading.

There are known two main kinds of restraint systems: ICC bar restraint systems to prevent the truck from moving away from the dock, and wheel restraint systems. However, while the first system is suitable for a majority of trailers, there are several configurations of trucks that cannot be secured by such ICC bars. Besides, ICC bars are built to absorb a rear impact with another truck and are not designed to resist a strong pulling force. In view of this fact, this system does not prevent the truck from moving away from the loading dock. The second category includes manual and mechanical chocks. Manual placement of a chock presents different problems, such as: chocks may be displaced, damaged, lost, or stolen. They also may slip on icy, oily or dusty surfaces and are often difficult to remove from their operational position because they may be wedged very tightly under the trailer's wheel. Very often, chocks are removed before the loading operation is complete, thus creating a dangerous situation where the vehicle can depart prematurely or slide away from the dock as heavy fork lifts enter the trailer. Also, docked trailers can be stolen mostly after business hours. In a lot of cases, targets for theft are trailers loaded with valuables, such as alcohol, beer, cigarettes, or any other goods.

Often, standard chocks are placed too far from the wheel to be effective because they can jam and become very difficult to remove; for example, when an empty trailer becomes heavily loaded, the weight on the tires makes them extend sideways, resulting in the wheel to sit on the chock. A tire can also jam into the chock if the air ride suspension causes a slight movement of the trailer when depressed. Standard chocks are sometimes left lying beside the wheel due to negligence.

Mechanical wheel chock systems are more effective than manual systems. However, they may be buried in the driveway during installations under ground, are expensive to install, require a drainage system to prevent them to be filled with water. They also are not very easy to service and have to travel a substantial distance from storage into operative position. Other mechanical chocks which are mounted on the surface may be affected by winter and become an obstacle during snow removal They may interfere with the tail gate of the truck or truck's undercarriage, and are inoperable with many types of vehicles.

This invention is related to my Canadian application No. 2,164,738, describing a wheel chock handling system including a movable arm attached by one end to a loading dock and another end to a wheel chock. The arm consists of a front arm and a rear arm A return spring is attached between the loading dock and the upper end of the rear arm.

The major disadvantage of said system was its effective range: because the spring was attached to the rear arm, the more said arm was extended, the more tension was created in the spring making the handling of said the chock attached to said arm harder and harder after 7 feet of extension of the arm from the loading dock. At the distance of 10 to 14 feet, handling the arm required a great deal of effort and force.

The present invention eliminated these problems and provides an improved system allowing a very easy and effortless way of handling heavy chocks.

SUMMARY OF THE INVENTION

The primary object of the present invention is a wheel chock restraint system provided to restrain the movement of a vehicle away from a loading dock during loading and unloading operations. The system comprises a wheel chock having an engagement means adapted to cooperate with a corresponding engagement means of a support plate mounted on the ground. The chock is attached to a movable arm attached to the loading dock and adapted to assure secure positioning of the chock under the wheel of the truck. The arm is provided with a tension means facilitating easy manipulation of the chock and placing the arm into the storage position.

Another object of the present invention is a sensor means provided to detect the wheel and to facilitate proper placement of the chock under the wheel.

Yet another object of the present invention is to provide a wheel chock equipped with a jamming or locking mechanism that will prevent an unauthorized chock removal during loading and unloading or during after business hours. Such jamming mechanism is activated from inside of the building. Jamming mechanism is incorporated within the chock.

Still another object of the present invention is to prevent solid jamming of the chock by means of a locking element keeping a slight distance between the wheel and the chock.

DETAILED DESCRIPTION OF THE PRESENT INVENTION

Figure 1:
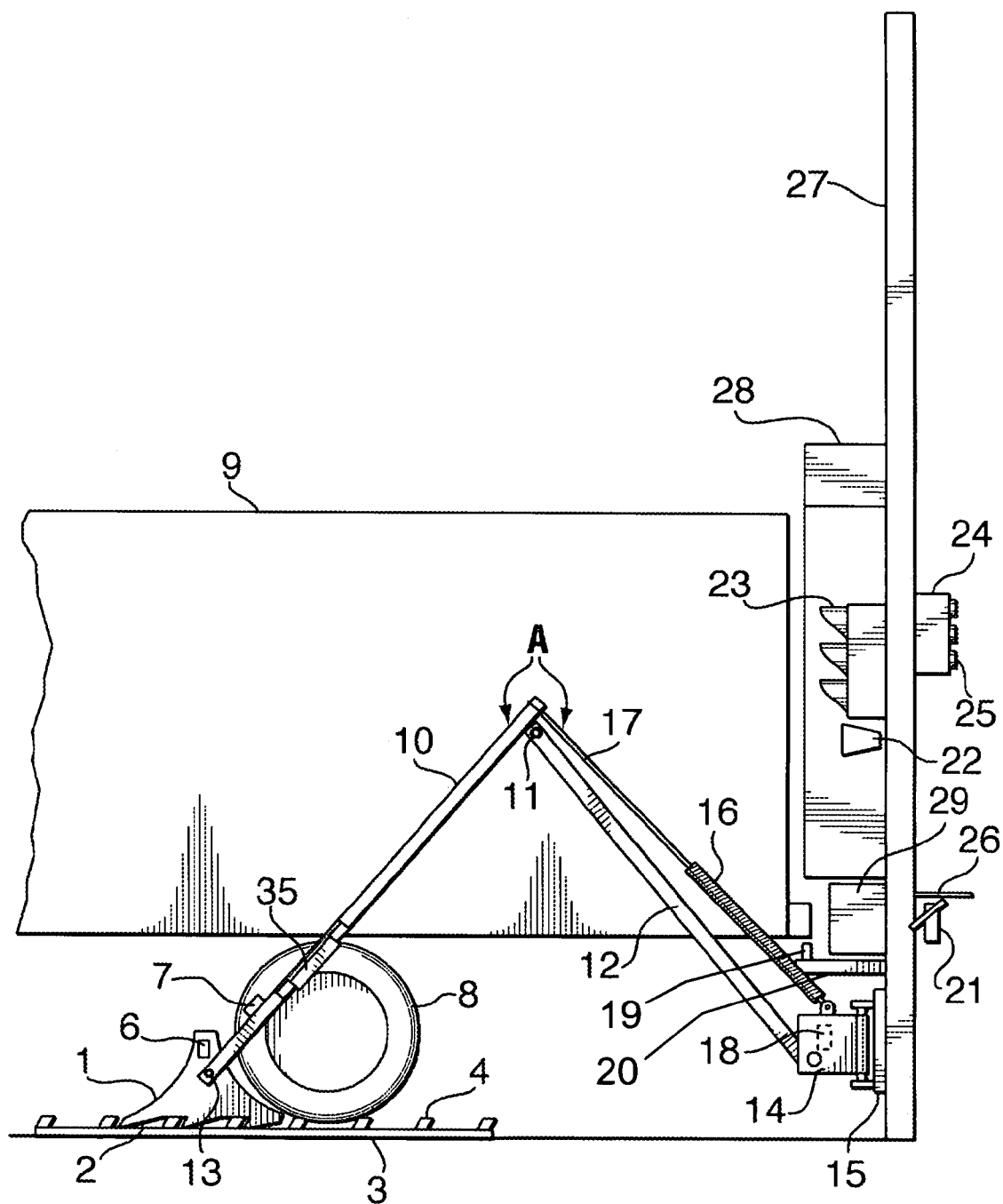
FIG. 1 shows a schematic side view of the first embodiment of the present invention.
Figure 2:
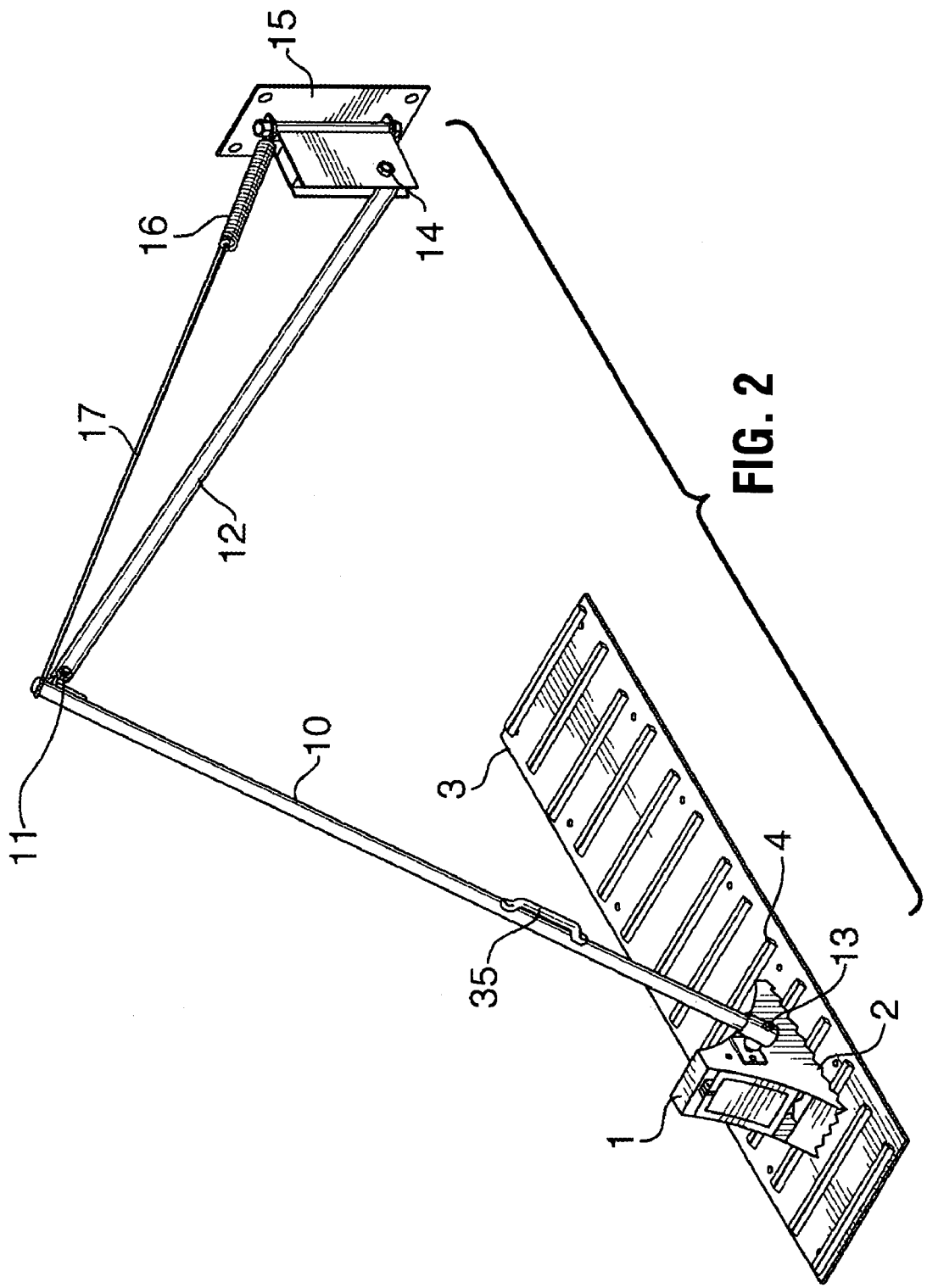
FIG. 2 shows a perspective view of the wheel chock restraint system of FIG. 1.

Referring to drawings, FIGS. 1 and 2 show the first embodiment of the present invention comprising a wheel chock 1 attached to a wheel chock support means including a movable arm A consisting of a front arm 10 pivotally attached to a rear arm 12. Rear arm 12 is pivotally attached to a loading dock 27 by means of a pivot or bracket 14. A tension means such as an extension spring 16 is attached by one end to a pivot 14 and by another end to an upper portion of the front arm 10 by means of a cable or steel rod 17. Pivot 14 allows the arm A to be rotated left and right and up and down, and to move it into storage position, in close proximity to the dock face (not shown) when not in use.

A supporting element 3 is fixed on the ground in the vicinity of the loading dock and comprises an elongated plate long enough to spread at least under one axle of a truck 9 during loading operation to facilitate a proper engagement of a wheel chock 1 with the plate 3. A base portion of the chock 1 is provided with a first engagement means or teeth 2 which are adapted to cooperate with the corresponding second engagement means or stoppers 4 located on plate 3.

Once the vehicle 9 is backed to the dock 27, the truck driver manually sets the chock 1 by means of a handle 35 mounted on the front arm 10 to engage the chock 1 with a wheel 8. The spring 16 attached from the pivot 14 to the upper portion of front arm 10 by means of cable 17 assists the manipulation of the driver of the movable arm A. In this case, on one hand the retention force created by engagement of teeth 2 of chock 1 and stoppers 4 of the plate 3 is directed away from the loading dock 27 and prevents the chock 1 from sliding away from the wheel 8 of the truck 9 when said truck makes attempts to depart prematurely from the dock 27. On the another hand, arm A creates an engagement force directed towards the loading dock 27 and presses chock 1 against the wheel 8. Such a combination of two forces allows to assure a secure positioning of truck 9 during loading and unloading, which is a very advantageous feature of the present invention.

Front arm 10 is pivotally attached to the chock 1 by means of a lower joint 13 and front arm 10 is pivotally connected to rear arm 12 by means of upper joint 11. It should be emphasized that upper joint 11 may be of any possible configurations, such as a universal joint, bracket with a pivot or any other means which facilitates effortless pivoting of both arms. The most important feature of the present embodiment is the fact that spring 16 is attached to the upper portion of the front arm 10. Such arrangement allows very easy manipulation of the system because the more arm A extends, the more spring 16 pulls and consequently chock 1 become lighter and lighter due to the leverage effect. This feature is a substantial improvement over my previous arrangement discussed above wherein spring was attached to the rear arm However, the present invention is not restricted to use of spring 16 and any other tension means may be used instead for the same purpose.

Pivot 14 is attached to the dock face 27 by means of an anchor plate 15. In the present invention, the engagement means of the chock comprises a plurality of angled teeth 2 extending downwardly from the base portion of the chock 1. Engagement means of the plate 3 comprises a plurality of extending upwardly stoppers 4. However, it must be emphasized that the present invention is not restricted to such an arrangement, and any other possible equivalents may be used instead for the same purpose. In use, chock 1 should be positioned in such a way that teeth 2 should be directed away from the loading dock 27.

Chock restraint system of FIG. 1 is also provided with different kinds of sensors facilitating secure loading and unloading procedures. Sensor 18 installed on the pivot 14 is provided to detect the extending movement of the arm A during placement of the chock 1 under the wheel 8. Sensor 6 installed on the chock 1 is provided to detect the presence of the wheel 8 at the moment said wheel engages the chock. This sensor 6 is a very advantageous feature of the present invention. When the arm is removed from storage position, sensor 18 will send a signal to illuminate a visual indicator 23 to warn the dock workers and drivers. Visual indicator 23 will be also illuminated in response to both sensors 18 and 6 to ensure that the arm A is utilized and that the wheel 8 is properly engaged. Detecting sensors could be of any possible arrangements, such as non-contact sensors (photocell), mechanical detectors with contact arm, or any other equivalent arrangement.

Truck presence detector 19 may be installed around the dock to detect a vehicle when arriving in the vicinity of the dock 27. Such detector may also be of contact or non-contact (photocell) arrangement, and is designed to sense the vehicle a few inches from the dock. Using the control panel 24, the vehicle detector 19 can be interlocked with other sensors, such as a restraint sensor 6 or 18 and dock leveller sensor 21. Movement of the truck during loading and unloading operations can trigger a loud alarm 22 to make the truck drivers and fork lift operators aware of danger. Dock leveller detector 21 is installed under the dock leveller 26 and is activated by said dock leveller 26. Loading entrance 27 is also provided with a dock seal 28, dock bumper 29 and interior lights 25 used for the same function as exterior lights 23.

In operation, when the truck backs into position with loading dock 27, wheel 8 rolls over the supporting plate 3. Once the truck 9 is backed up to dock 27, the truck driver will manually set the chock 1 by means of handle 35 mounted on the front arm 10 to engage with the wheel 8. The spring 16 attached from the pivot 14 to the upper portion of the front arm 10 by cable 17 will assist the manipulation of the arm A by the driver to allow easy handling. The dock leveller 26 spans the gap between the bed of the truck 9 and the floor to allow forklifts to go in and out of the truck 9, which is backed to the dock 27 against the dock bumper 29.

The sensor 7 or sensor 6 will sense the wheel 8 to ensure a proper positioning of the chock 1, and the detector 18 of pivot 14 will signal the use of the extendable arm A. Proper positioning of the chock 1 is facilitated by articulations of pivot 14, upper joint 11 and lower joint 13. The truck presence detector 19 mounted on the bracket 20 will sense the truck 9 when approaching 4-5 inches from the dock bumper 29. In case the truck 9 will start to move away during the loading operation, dock leveller detector 21 interlocked with the dock leveller 26 together with the truck presence detector 19 will trigger alarm 22. All following detectors 6, 7, 18, 19 and 21 are operatively connected to the control panel 24 which will illuminate lights 23 and 25 to indicate when the loading operation is safe.

Such arrangement of using detectors to indicate the right setting of the chock is also a very important feature of the present invention because it eliminates all possible premature movements of the truck from the loading dock and prevents any accidents.

Chock 1 is made from high tensile weather resistant galvanized steel which is many times harder than conventional steel. All weather chock combined with non-skid plate can provide 60,000 lbs. of restraining force.

Figure 3:
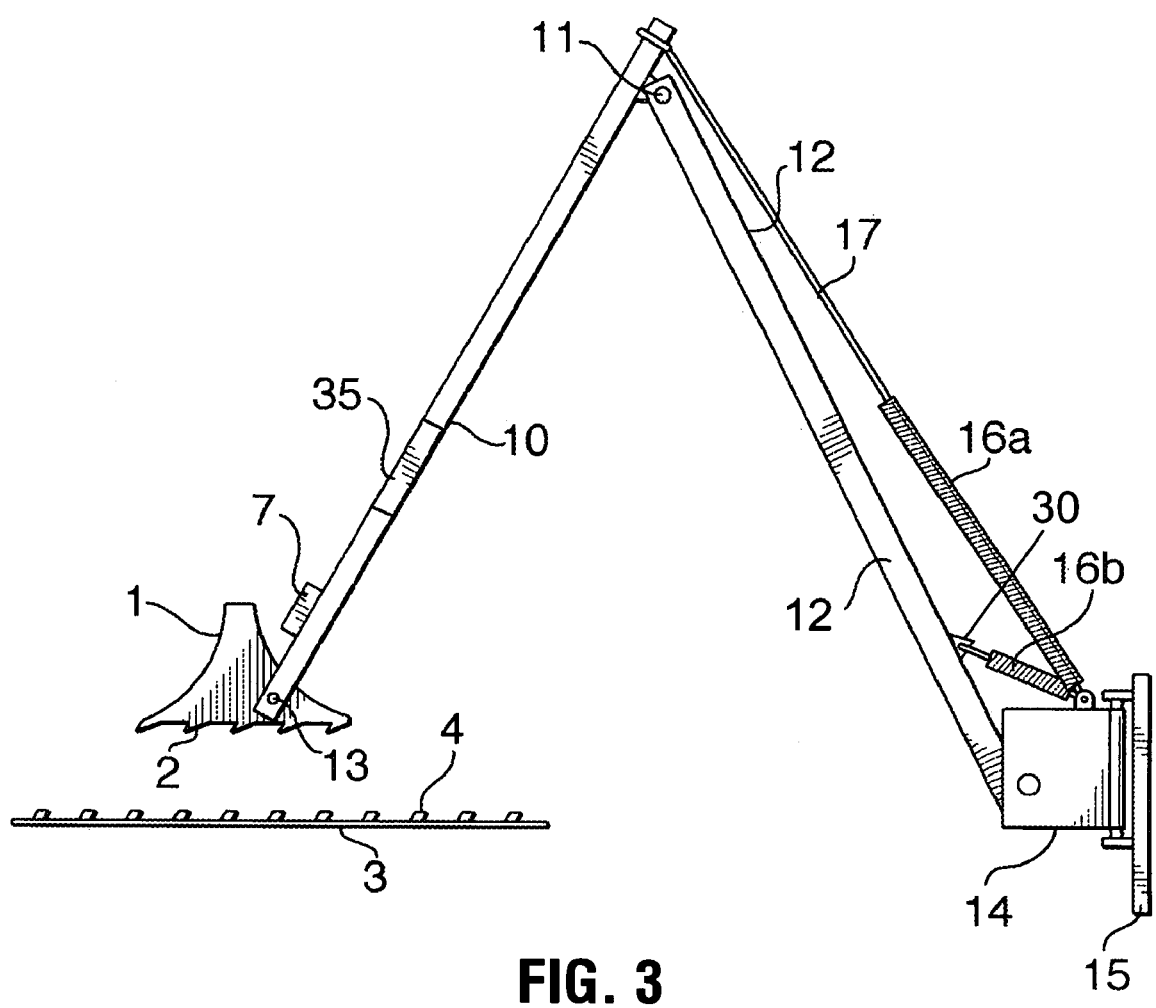
FIG. 3 shows a schematic side view of a second embodiment of the present invention.

FIG. 3 shows a second embodiment of the present invention wherein instead of one spring there are used two springs 16a and 16b. In this embodiment spring 16b is attached between the pivot 14 and the rear arm 12 by means of a protrusion 30. Second spring 16a is attached by one end to the pivot 14 and by another end to the upper portion of the front arm 10 by means of the cable 17. Second spring 16a is provided to pull the upper portion of the front arm 10 to facilitate easy handling of a big chock. The sensor 7 senses when wheel 8 engaging the chock 1 in the same manner as previous embodiment.

For both embodiments shown on FIG. 1 and FIG. 3 the attachment point of cable or rod 17 depends upon the length of the front arm 10, weight of said arm 10 and chock 10 and the strength of the tension means.

Figure 4A:
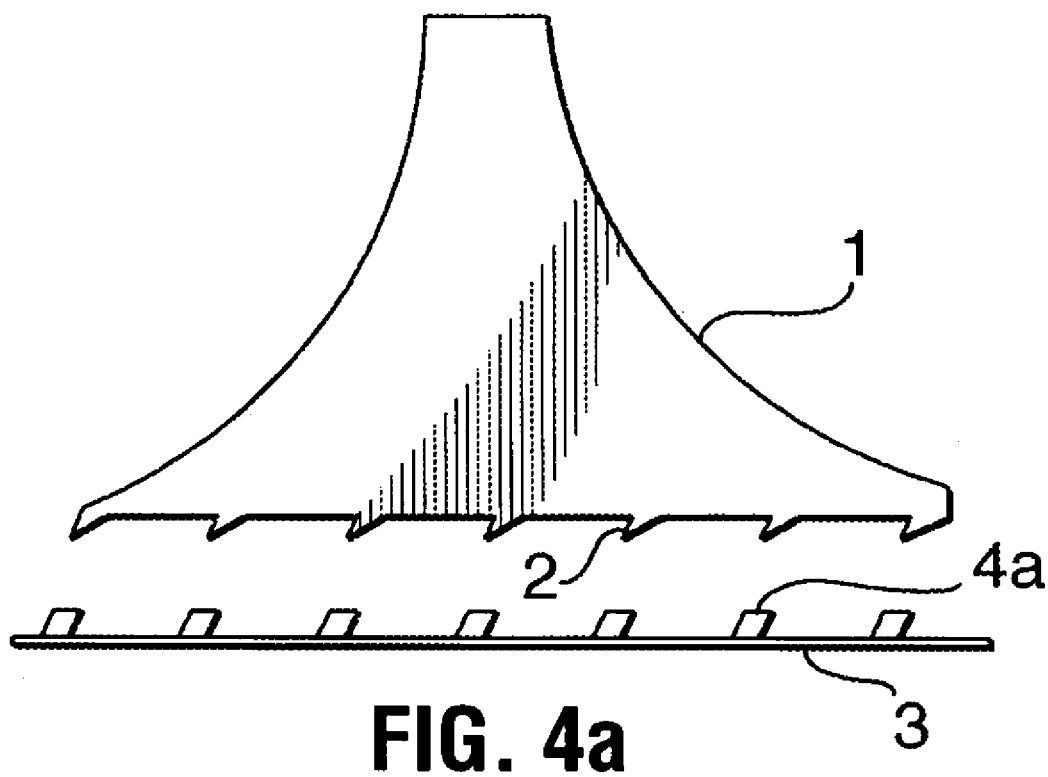
FIG. 4 (*a, b, c*) shows different modifications of the configuration of the base portion of the chock and the support plate.

FIGS. 4 a, b and c show different modifications of the configuration of the base portion of the chock 1 and stoppers 4 of the supporting plate 3. FIG. 4a shows base portion of the chock provided with a plurality of angled teeth 2 extending downwardly. Stoppers have configuration of a plurality of angled rods 4a extending upwardly from the plate 3 and inclined under an angle corresponding to the angle of the teeth 2. Stoppers 4a are mounted transversally along the plate 3. Such complimentary angled configuration of teeth 2 and stopper 4 allows a very secure engagement preventing the chock 1 from tumbling and sliding when the truck 9 is exerting a strong pull-out force.

Figure 4B:
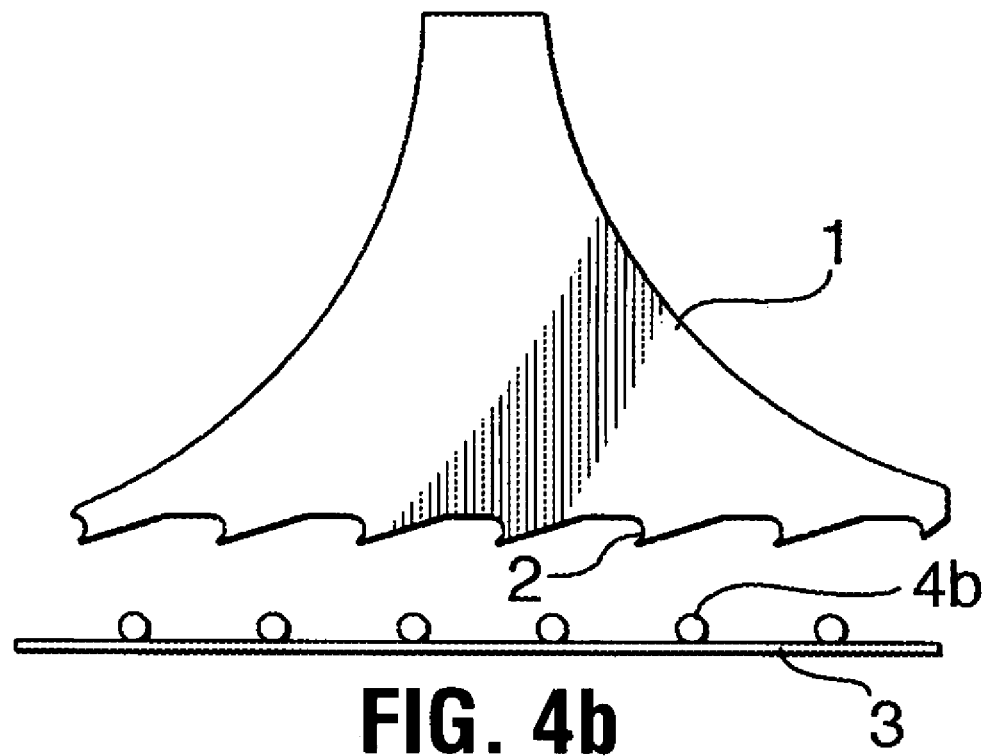

FIG. 4b shows angled teeth 2 of chock 1 cooperating with cylindrical stoppers 4b mounted transversally along the plate 3. FIG. 4c shows angled teeth 2 of chock 1 engaging a plurality of transversal grooves 4c formed in the plate 3. Preferably grooves 4c are cut in angle to facilitate better engagement with teeth 2.

Teeth 2 of chock 1 have a hook-shaped configuration and are inclined under the angle in the range between 0 and 90 degrees. Preferably, the angle is chosen between 5 and 30 degrees.

Figure 5A:
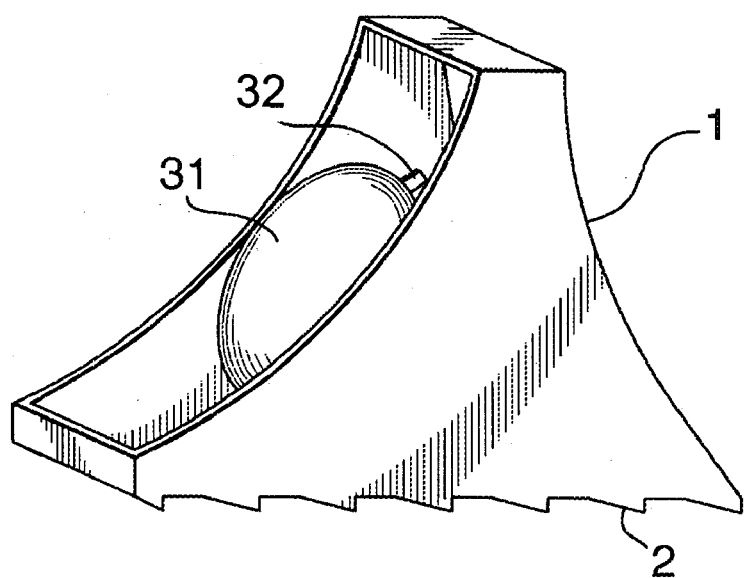
FIG. 5 (*a, b, c*) shows perspective views of the modification of sensors installed on the chock.

FIGS. 5 a, b, and c show different modifications of the sensor 6 installed inside the body of the chock 1. FIG. 5a shows an air-pressure sensitive detector comprising an air balloon 31 provided with an air sensor gauge 32 which is activated when the wheel 8 engages the chock 1.

Figure 5B:
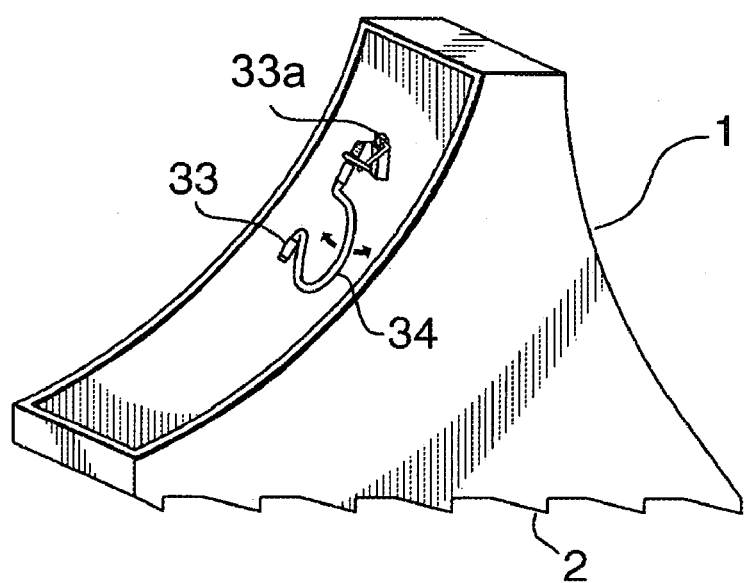

FIG. 5b shows a spring-activated sensor comprising a spring pivot 33, spring lever 34 and switch 33a. When wheel 8 engages the chock, it will rotate spring lever 34 activating the switch 33a. Spring 33 is adapted to bring lever 34 into the position, thus allowing the chock 1 to be set from any angle.

Figure 5C:
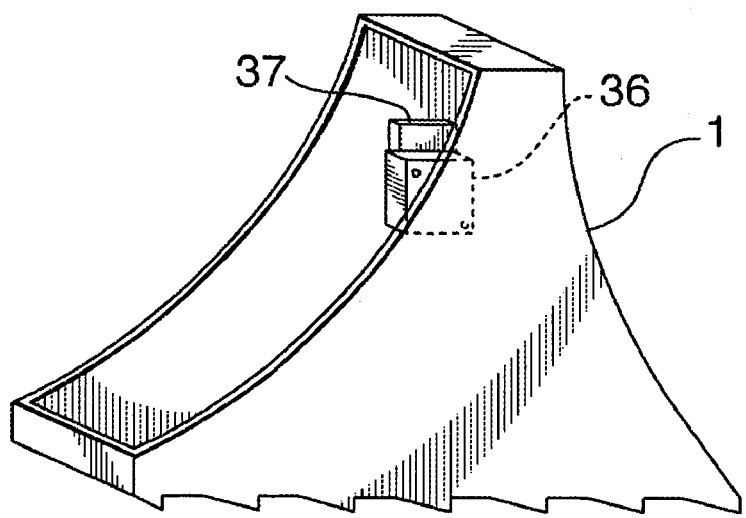

FIG. 5c shows an electronic sensor 36 installed by means of steel or rubber bracket 37 to shield it from strong vibration. Due to its save positioning inside the chock 1, sensor 36 is able to sense the wheel even when it is wet or during toughest weather conditions and to assure proper positioning of the chock 1. Such sensor can be wired, working on radio frequency or may be operated by any other means. The sensor 36 will detect the wheel 8 when properly set and send a signal to the control panel 24 that will activate light 23 or interlock with dock leveller 26. It also can be linked to the truck presence detector 19.

Figure 6:
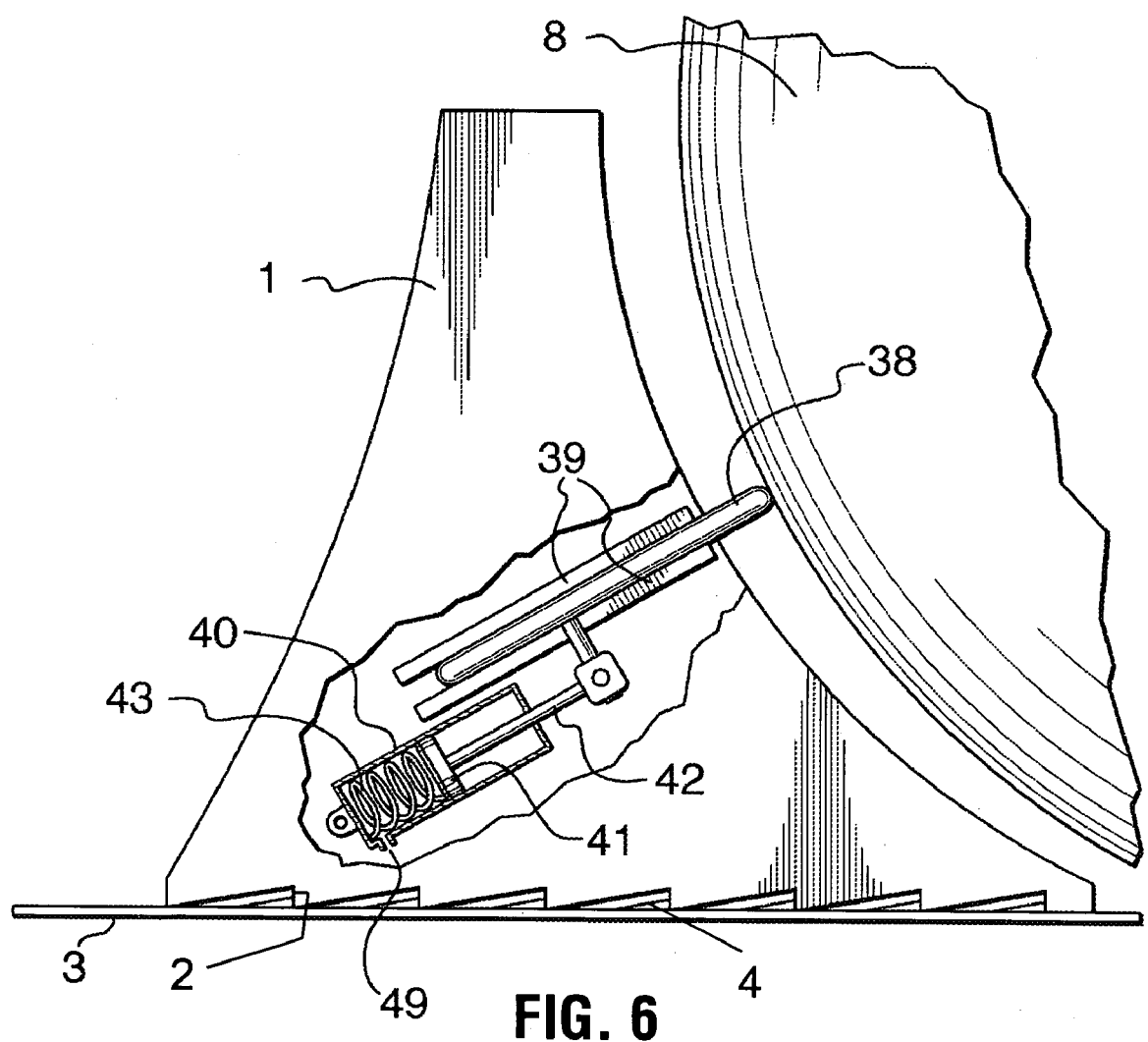
FIG. 6 shows a side view on the chock provided with an anti-theft means locking device.
Figure 7:
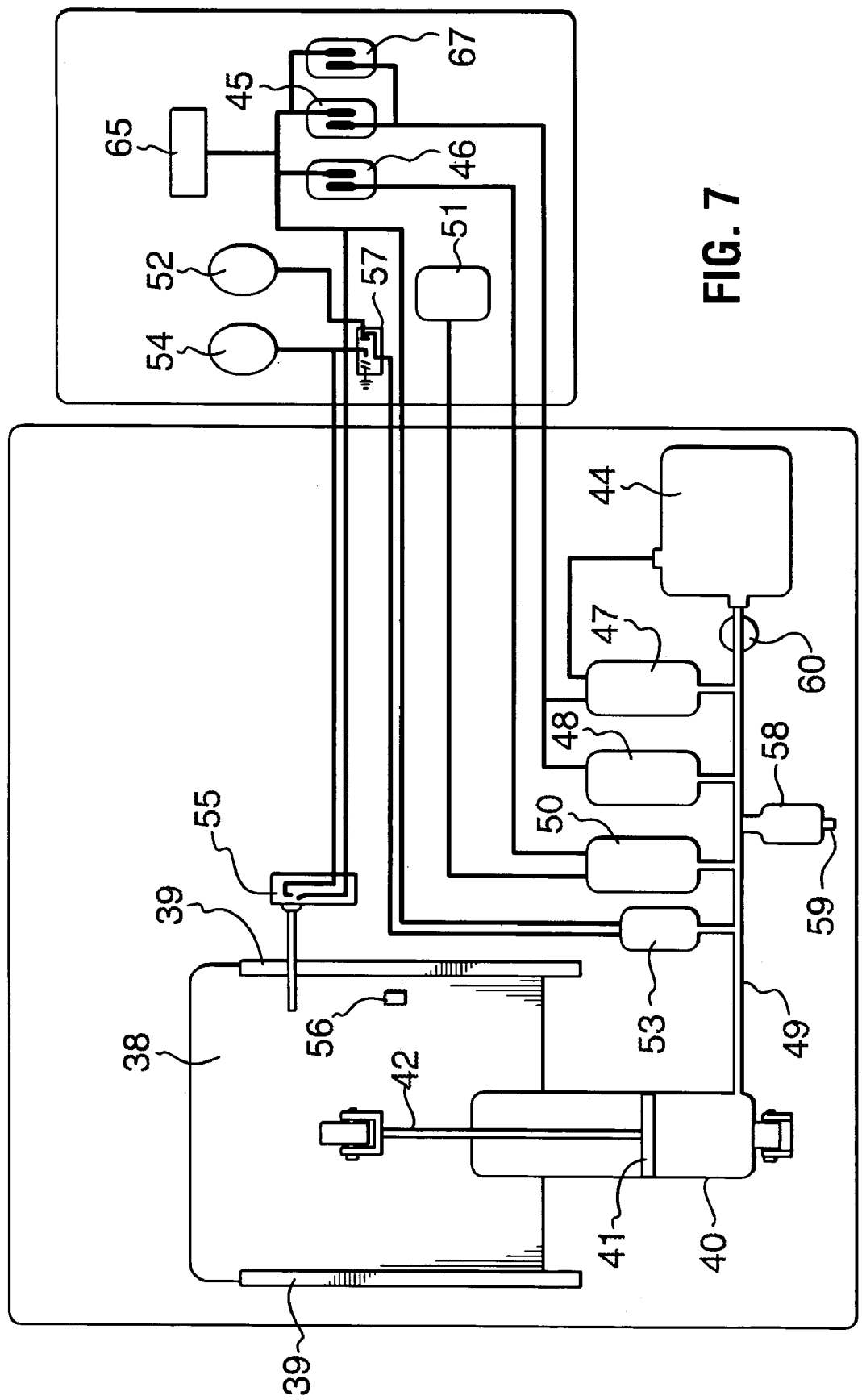
FIG. 7 shows a schematic block diagram of elements controlling chock of FIG. 6.

FIGS. 6 and 7 show yet another modification of the chock 1 provided with an anti-theft arrangement comprising a locking mechanism activated by remote activating means that can lock the chock 1 against the wheel 8. The locking mechanism consists of a locking element 38 which is adapted to slide within a support guide 39. The movement of element 38 is provided by means of an air cylinder 40 having a piston 41, connecting rod 42 and spring 43 which is provided to exert a minimum tension to activate element 38. When locking element 38 is activated, it makes contact against the tire 8. In this case, the combination of opposite forces created by teeth 2 of chock 1 engaging stoppers 4 of plate 3 and forces created the locking element 38 tightly abutting tire 8 facilitate complete locking of chock 1 against wheel 8, which is a substantial advantage of the present invention.

FIG. 7 shows a complete assembly provided to activate the locking function of the mechanism shown on FIG. 6. As it was mentioned above, the locking element 38 slides within support guide 39 and is activated by means of air cylinder 40. The compressed air for cylinder 40 is produced by an air compressor 44 located inside of the chock and necessary power is supplied by a power supply 65. Compressor 44 is activated by a signal transmitted from switch or sensor 45 or an alarm system switch 67 located in the building. A pressure switch 47 installed on the air line between switch 45 and air compressor 44 is provided to maintain a steady pressure in cylinder 40. A release valve 48 is placed in the air input conduit 49 to release air from cylinder 40 when power is cut by switch 45 which is done to release air and to allow the locking element 38 to disengage the wheel 8. Such arrangement provides a very important function of the present invention: to control the release of the wheel of a docked vehicle when the loading is complete and to facilitate locking of wheel after business hours. After business hours, the alarm system is 'on' and the signal from switch 45 is replaced by one transmitted from the alarm system or switch 67 controlling the locking of the wheels of docked vehicles to prevent said vehicles from being stolen.

A differential pressure switch 50 is installed on the air input conduit 49 and is connected to the control panel 51 located in the building. Control panel 51 is connected to the alarm (anti-theft) system or switch 67 also located within the building. The chock 1 cannot be removed once switch 50 is activated by signal transmitted from the alarm system. If variation is sensed in pressure applied to the chock 1, the alarm system can be activated automatically.

A green light 52 inside the building is activated by means of the pressure switch 53 installed on the input air conduit 49 to control correct pressure inside the cylinder 40 and to properly position locking element 38. A red light 54 is activated by means of a detector 55 inside the chock 1. Detector 55 is activated by means of a stopper 56 attached to locking element 38. Detector 55 sends signal to a relay 57 that cuts power supplied to green light 52. In this case, stopper 56 will activate detector 55 only when locking element 38 does not make the necessary contact with the wheel 8 and extends to its limit. Red light 54 can warn of non-safe operation. An audible means can be added to signal danger, for example when chock 1 is positioned too far from the wheel 8 or beside it. A one-way valve 60 can be installed between air compressor 44 and pressure switch 47.

When loading operation takes place, fork lifts going inside the docked vehicle may cause some movement affecting change in pressure applied to locking element 38. To control this situation, an air reserve tank 58 equipped with a safety valve 59 will supervise such variation of the pressure and will prevent cylinder 40 from being overloaded.

It must be emphasized that when activated, the locking element 38 should abut the tire 8 to press it and lock the chock 1 in place. Such movement of locking element 38 will be within a certain range to facilitate proper positioning against the tire. In case locking element 38 will not be able to engage the tire, the locking device of chock 1 will signal this non-safe situation.

Embodiments shown on FIGS. 6 and 7 are not restricted to the locking arrangement using air pressure mechanism to move locking element 38, and any other suitable means, such as electro-magnetic solenoid or electrical reversible motor with a rod can be used for the same purpose.

Figure 8:
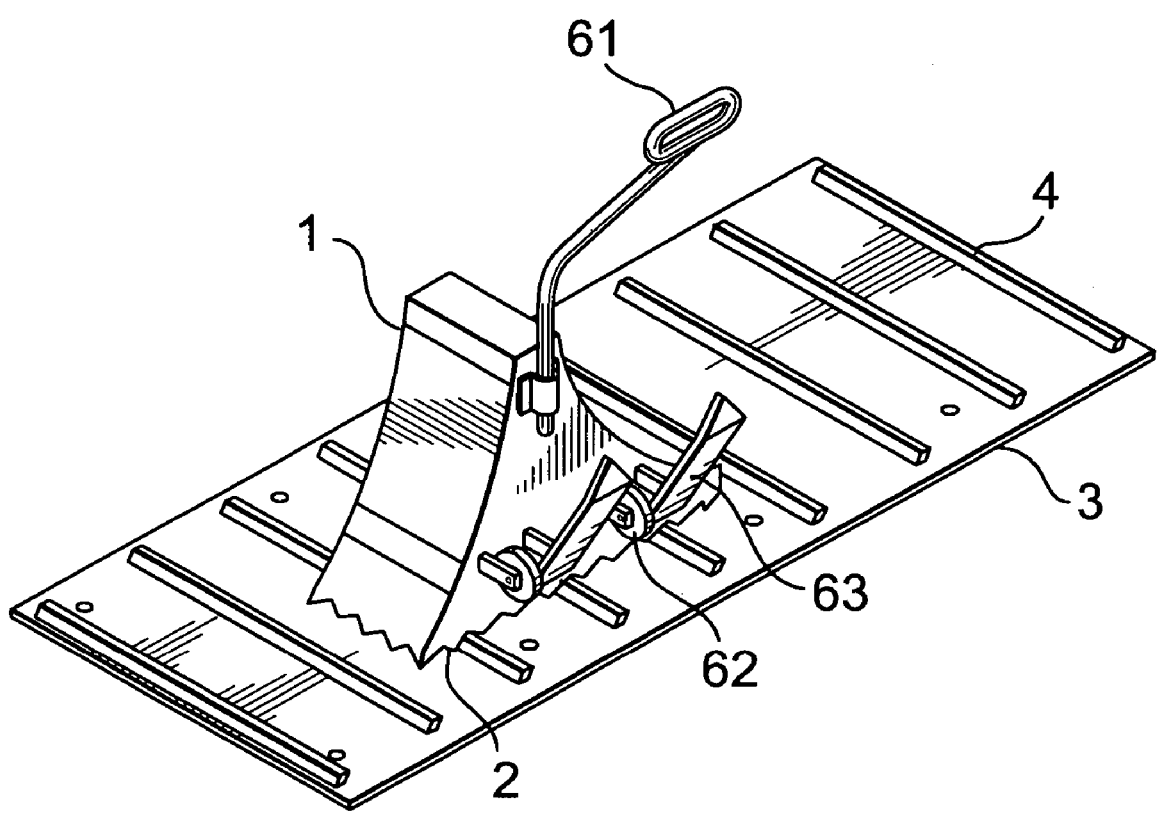
FIG. 8 shows a perspective view according a third embodiment of the present invention.

FIG. 8 shows a third embodiment of the present invention comprising the chock 1 and supporting plate 3 similar to the one shown on FIG. 1. In this embodiment, wheel chock support means comprise a handle 61 and set of wheels 62 mounted on a side of the chock 1. Chock 1 is moved to the proper position manually by the driver using handle 61 and wheels 62. There are also a set of skis 63 attached beside wheels 62 which may be used during winter season.

The present invention has the following advantages over all known systems:
- it is simple and easy to operate due to non-jamming mechanism of the arm;
- involves the driver in the safety process;
- interlocks with dock leveller;
- arm can be extended up to 14 feet from the loading dock;
- minimum maintenance is required;
- galvanized assembly provides excellent durability;
- non ICC bar dependent;
- easy snow removal when the arm is stored;
- presence of highly visible warning system when truck departs prematurely;
- anti-theft mechanism preventing unauthorized movement of chock.

Thus, it can be seen that the objects of the present invention have been satisfied by the structure presented hereinabove. While in accordance with the Patent Statutes, only the best mode and preferred embodiments of the present invention have been presented and described in detail, it is to be understood that the invention is not limited thereto or thereby. Accordingly, for an appreciation of the true scope and breadth of the invention, references should be made to the following claims.

The invention claimed is:

1. A wheel chock restraint system, comprising
a wheel chock;
a supporting element mounted on a ground in a vicinity of a loading dock,
a wheel chock support means connected by one end to said wheel chock and by another end in a vicinity of said loading dock,
wherein a base portion of said chock is provided with a first engagement means, wherein said first engagement means are directed downwardly outwardly in relation to said loading dock, and wherein said supporting element is provided with a corresponding second engagement means, wherein said first engagement means are adapted to cooperate with said second engagement means thus creating a retention force, said retention force is directed away from said loading dock and prevents said chock from sliding away when a vehicle makes an attempt to depart prematurely from said loading dock;
wherein said wheel chock support means is adapted to assure a secure positioning of said chock under the wheel of said vehicle during loading and unloading operation by means of creating an engagement force directed towards said loading dock and pressing said chock against said wheel;
wherein said system comprises an anti-theft locking means, wherein said locking means together with said first and second engagement means are adapted to securely lock said chock on the wheel of said vehicle and to prevent any unauthorized removal of said chock and theft of said vehicle, and
wherein said locking means is activated remotely by an activating means, said activating means is adapted to lock said locking means against the wheel of said vehicle.

2. A wheel chock restraint system according to claim 1, wherein said first engagement means comprises a plurality of teeth extending downwardly from said base portion of the chock under a predetermined angle.

3. A wheel chock restraint system according to claim 2, wherein said chock is placed on said supporting element in such a way that said teeth are directed away from said loading dock.

4. A wheel chock restraint system according to claim 2, wherein said supporting element has a configuration of an elongated plate, said plate having a length sufficient enough to be spread at least under one axle of said vehicle during the loading operation to facilitate a proper engagement of said wheel chock with said plate.

5. A wheel chock restraint system according to claim 4, wherein said second engagement means comprise a number of stoppers mounted across said plate.

6. A wheel chock restraint system according to claim 5, wherein said stoppers comprise a plurality of rods having a cylindrical configuration.

7. A wheel chock restraint system according to claim 1, wherein said wheel chock support means is a movable arm comprising a front arm pivotally connected to a rear arm, said front arm is pivotally connected to said wheel chock and said rear arm is pivotally connected to a dock face, said movable arm means is provided with a tension means provided to facilitate an easy placement of said chock under the wheel of said vehicle and to facilitate a placement of said restraint system into a storage position.

8. A wheel chock restraint system according to claim 7 wherein said tension means is a spring connected by one end to said dock face and by another end to an upper portion of said front arm, wherein the more said spring extends the more it pulls on said upper portion of said front arm to facilitate proper setting of said chock under the wheel.

9. A wheel chock restraint system according to claim 7, wherein said system further comprises a sensor means provided to facilitate a proper placement of said chock under the wheel of said vehicle.

10. A wheel chock restraint system according to claim 9, wherein said sensor is mounted within said wheel chock, said sensor is adapted to detect the presence of said wheel in the moment when said wheel engages said chock.

11. A wheel chock restraint system, comprising
a wheel chock;
a supporting element mounted on a ground in a vicinity of a loading dock;
a wheel chock support means connected to said chock;
wherein a base portion of said chock is provided with a first engagement means, wherein said first engagement means are directed downwardly outwardly in relation to said loading dock, and wherein said supporting element is provided with a corresponding second engagement means, wherein said first engagement means are adapted to cooperate with said second engagement means, thus creating a retention force that applies no pressure on a wheel of a vehicle, said retention force is directed away from said loading dock and prevents said chock from sliding away when said vehicle makes an attempt to depart prematurely from said loading dock;
wherein said wheel chock support means is adapted to assure a secure positioning of said chock under the wheel of said vehicle during loading and unloading operation;
wherein said system further comprises an anti-theft locking means, wherein said locking means together with said first and second engagement means are adapted to securely lock said chock on the wheel of said vehicle and to prevent any unauthorized removal of said chock and theft of said vehicle, and wherein said locking means is activated remotely by an activating means, said activating means is adapted to lock said locking means against the wheel of said vehicle.

12. A wheel chock restraint system according to claim 11, wherein said system further comprises a sensor means provided to facilitate a proper placement of said chock under the wheel of said vehicle.

13. A wheel chock restraint system according to claim 11, wherein said locking means are adapted to detect said wheel and to transmit a signal indicating proper positioning of said chock.

14. A wheel chock restraint system according to claim 10, wherein said sensor means comprising an electronic sensor, said electronic sensor is adapted to detect said wheel and to send a signal to a control panel.

15. A wheel chock restraint system according to claim 11, wherein said activating means is an air cylinder located in said chock.

16. A wheel chock restraint system according to claim 15, wherein said air cylinder is activated by means of a signal transmitted from a remote switch means.

17. A wheel chock restraint system according to claim 16, wherein said air cylinder is provided with a release valve adapted to release air from said cylinder thus allowing controlled disengagement of said locking means from said wheel when loading operation is complete and to facilitate locking of said wheel.

18. A wheel chock restraint system according to claim 17, wherein said locking means is provided with an additional air reserve means adapted to compensate changes of pressure applied to said locking means during loading and unloading operations.

19. A wheel chock restraint system, comprising
a wheel chock;
a supporting element mounted on a ground in a vicinity of a loading dock;
a wheel chock support means connected to said chock;
wherein a base portion of said chock is provided with a first engagement means, wherein said first engagement means are directed downwardly outwardly in relation to said loading dock, and wherein said supporting element is provided with a corresponding second engagement means, wherein said first engagement means are adapted to cooperate with said second engagement means, thus creating a retention force that applies no pressure on a wheel of a vehicle, said retention force is directed away from said loading dock and prevents said chock from sliding away when said vehicle makes an attempt to depart prematurely from said loading dock;
wherein said wheel chock support means is adapted to assure a secure positioning of said chock under the wheel of said vehicle during loading and unloading operation;
wherein said system further comprises an anti-theft locking means, wherein said locking means together with said first and second engagement means are adapted to securely lock said chock on the wheel of said vehicle and to prevent any unauthorized removal of said chock and theft of said vehicle, and
wherein said locking means is further provided with a detector means, said detector means is adapted to be activated when said locking means does not make necessary contact with the wheel, thus signalling a non-safe situation.

20. A wheel chock restraint system according to claim 19, wherein said locking means is activated remotely by an activating means, said activating means is adapted to lock said locking means against the wheel of said vehicle.

21. A wheel chock restraint system according to claim 20, wherein said activating means is an air cylinder located in said chock.

* * * * *